(12) United States Patent
Bernhardt et al.

(10) Patent No.: US 8,052,111 B2
(45) Date of Patent: Nov. 8, 2011

(54) SEAT TRACK ASSEMBLY

(75) Inventors: Don Bernhardt, Walled Lake, MI (US); Tony Centi, Grosse Ile, MI (US); Alan M. Wagner, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 122 days.

(21) Appl. No.: 11/975,780

(22) Filed: Oct. 22, 2007

(65) Prior Publication Data

US 2009/0102261 A1 Apr. 23, 2009

(51) Int. Cl.
*F16M 13/00* (2006.01)
*B60N 2/46* (2006.01)

(52) U.S. Cl. .......... 248/429; 248/430; 297/411.35; 384/49; 296/65.11

(58) Field of Classification Search .......... 248/430, 248/429, 298.1, 424, 903; 384/49, 51; 297/317.8, 297/322, 329, 341, 411.35; 296/65.11, 65.14
See application file for complete search history.

(56) References Cited

U.S. PATENT DOCUMENTS

| | | | | |
|---|---|---|---|---|
| 1,982,908 A | * | 12/1934 | Eustis et al. | 384/49 |
| 4,088,378 A | | 5/1978 | Pallant et al. | |
| 4,398,775 A | * | 8/1983 | Hofmann et al. | 384/484 |
| 4,511,187 A | * | 4/1985 | Rees | 384/18 |
| 4,588,234 A | * | 5/1986 | Rees | 384/47 |
| 4,602,758 A | * | 7/1986 | Mann et al. | 248/430 |
| 4,993,528 A | * | 2/1991 | Lederman | 192/45 |
| 5,553,946 A | * | 9/1996 | Agari | 384/49 |
| 5,938,164 A | | 8/1999 | Kargol et al. | |
| 5,941,495 A | | 8/1999 | Bauer et al. | |
| 6,116,561 A | | 9/2000 | Christopher | |
| 6,499,712 B1 | | 12/2002 | Clark et al. | |
| 6,860,538 B2 | | 3/2005 | Müller et al. | |
| 6,886,797 B2 | | 5/2005 | McCullen et al. | |
| 7,147,195 B2 | | 12/2006 | Danjo et al. | |
| 2002/0008183 A1 | * | 1/2002 | Mallard et al. | 248/429 |
| 2002/0084683 A1 | | 7/2002 | Christopher | |
| 2005/0051694 A1 | * | 3/2005 | Willems et al. | 248/429 |
| 2005/0145768 A1 | * | 7/2005 | Rohee et al. | 248/430 |

FOREIGN PATENT DOCUMENTS

FR 2567463 A1 * 1/1986

* cited by examiner

*Primary Examiner* — Kimberly Wood
(74) *Attorney, Agent, or Firm* — MacMillan, Sobanski & Todd, LLC

(57) ABSTRACT

This invention relates to a vehicle seat track assembly. The assembly comprises a first track member having an upwardly facing bearing surface and a second track member for attachment to a vehicle seat, the second track member having a downwardly facing bearing surface. A cage is disposed between the first track member and the second track member. The cage carries a rolling element that is in rolling engagement with the upper and lower bearing surfaces to provide longitudinal movement of the first track member relative to the second track member. The cage is provided with at least one pad section for engaging at least one of the upwardly and downwardly facing bearing surfaces. In an unloaded state, the at least one pad section separates the upwardly and downwardly facing bearing surfaces from each other by a distance which is greater than the diameter of the rolling element.

18 Claims, 4 Drawing Sheets

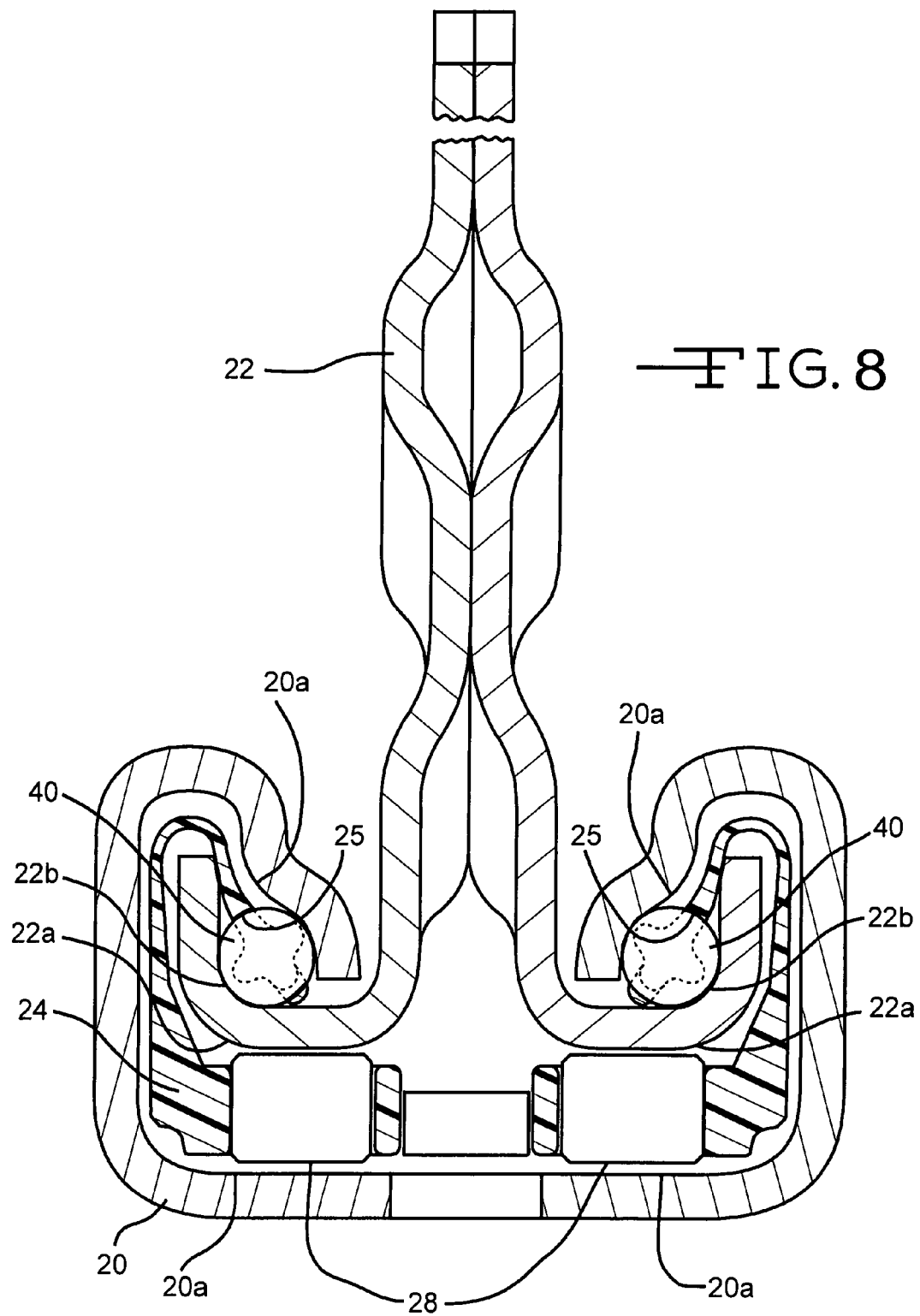

SEAT TRACK ASSEMBLY

BACKGROUND OF THE INVENTION

This invention relates in general to a seat track assembly for a vehicle, and in particular to a seat track assembly that includes a roller assisted frictional element for assisting motion in the fore and aft direction as well as for providing impact and load dampening characteristics.

Most vehicle seats, particularly in passenger vehicles, are generally provided with adjustment mechanisms to allow a seat occupant to position the seat for optimal comfort and convenience. A vehicle seat typically includes a seat back that is mounted with a seat bottom. Many vehicle seats also include a recliner mechanism to adjust the angle of the seat back relative to the seat bottom. Vehicle seats can also include mechanisms that allow movement of the seat forward and backward (fore and aft) relative to the floor of the vehicle. To accomplish this, vehicle seats are mounted on a seat support frame that is mounted on first and second spaced apart track assemblies. Each assembly has an upper track connected to the seat support frame that is slidably mounted on a lower track that is fixed to the vehicle floor. The seat track assembly generally also includes an element disposed between the upper and lower track that facilitates the sliding movement between the upper and lower tracks. Sliding elements using various rolling elements, such as roller bearings or ball bearings, are known in the prior art. Sliding elements including a low-friction member between the tracks are also known.

Over time, the forces exerted on the vehicle seat cause uneven wearing of conventional seat track assemblies. Specifically, small indentations or bumps from the rolling elements can form on the upper and lower tracks of the seat track assembly, especially when the rolling elements are left at the same position along the length of the tracks for extended periods of time. These indentations cause the fore and aft movement of the seat to become rough and eventually impairs the fore and aft movement of the vehicle seat altogether.

SUMMARY OF THE INVENTION

This invention relates to a vehicle seat track assembly. The vehicle seat track assembly includes a first track member for attachment to a vehicle frame. The first track member has an upwardly facing bearing surface. The seat track assembly also includes a second track member for attachment to a vehicle seat, the second track member having a downwardly facing bearing surface. A cage is disposed between the first track member and the second track member, and the cage carries a rolling element that is in rolling engagement with the upper and lower bearing surfaces to provide longitudinal movement of the second track relative to the first track. The cage is provided with at least one pad section for engaging at least one of the upwardly and downwardly facing bearing surfaces. In an unloaded state, the pad section separates the upwardly and downwardly facing bearing surfaces from each other by a distance which is greater than the diameter of the rolling element.

Various aspects of this invention will become apparent to those skilled in the art from the following detailed description of the preferred embodiment, when read in light of the accompanying drawings.

BRIEF DESCRIPTION OF THE DRAWINGS

FIG. 8 is a cross-section of the assembled seat track assembly including the roller assisted frictional element of the present invention.

DETAILED DESCRIPTION OF THE PREFERRED EMBODIMENT

Figure 1:
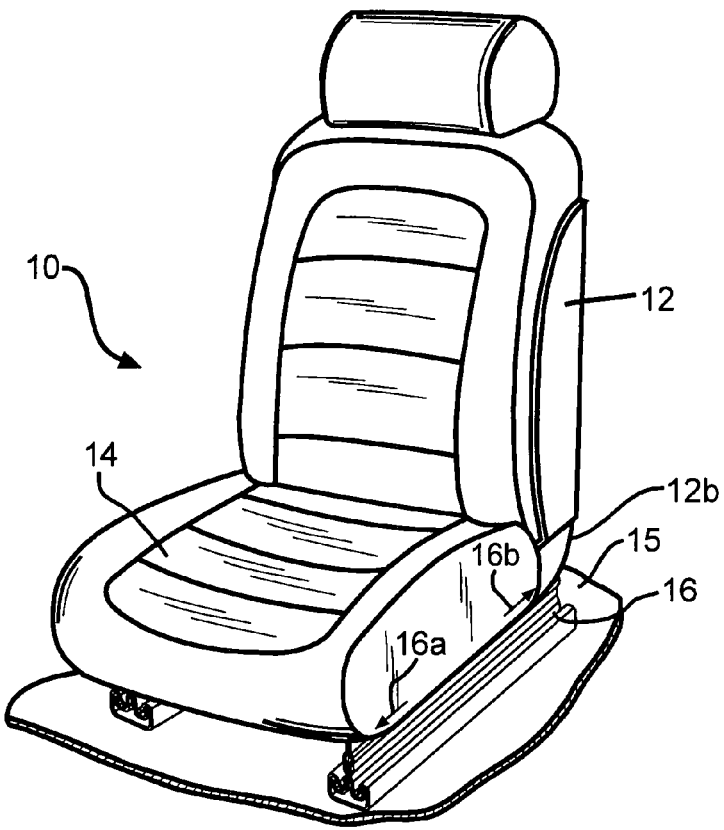
FIG. 1 is a perspective view of a vehicle seat supported on the vehicle seat track assembly of the present invention.
Figure 2:
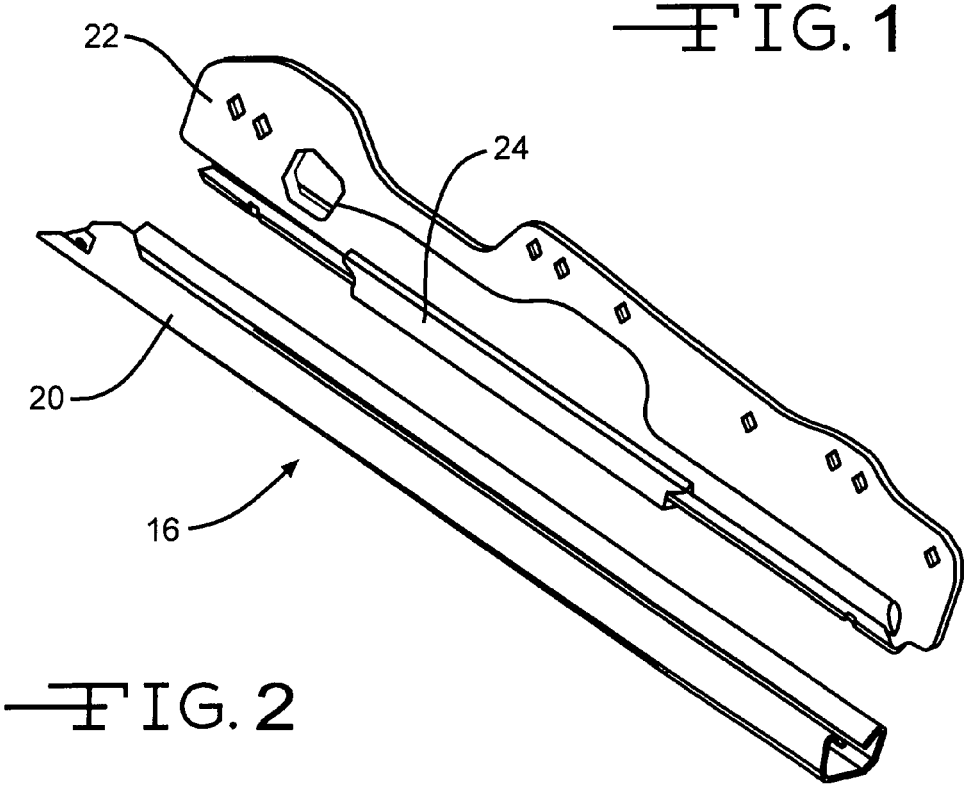
FIG. 2 is a partially exploded perspective view of the vehicle seat track assembly of the present invention.
Figure 3:
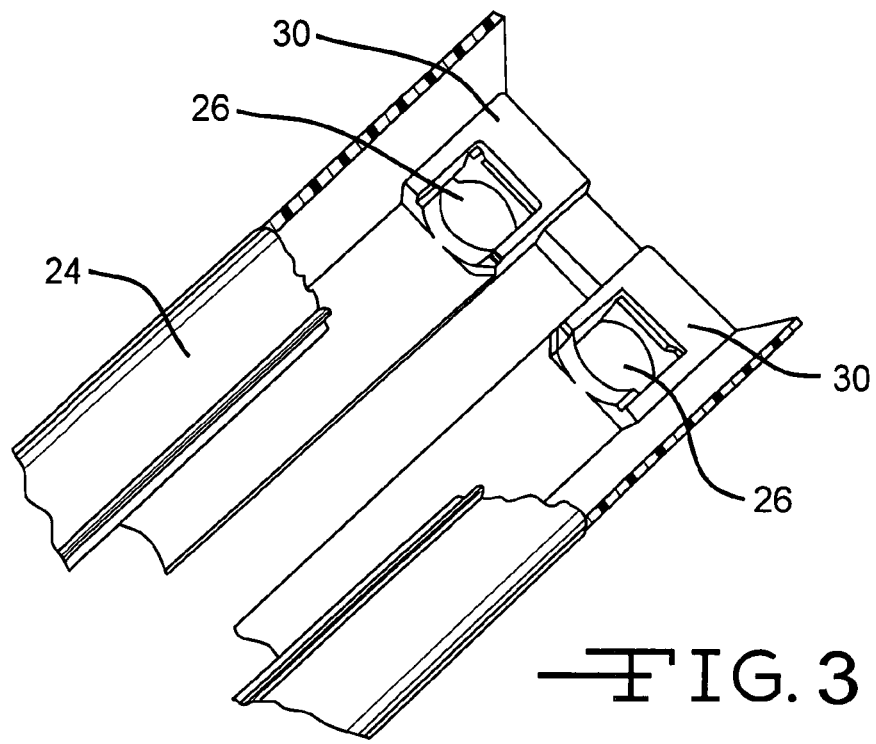
FIG. 3 is a perspective view of the top surface of the roller assisted frictional element of the seat track assembly of the present invention.
Figure 4:
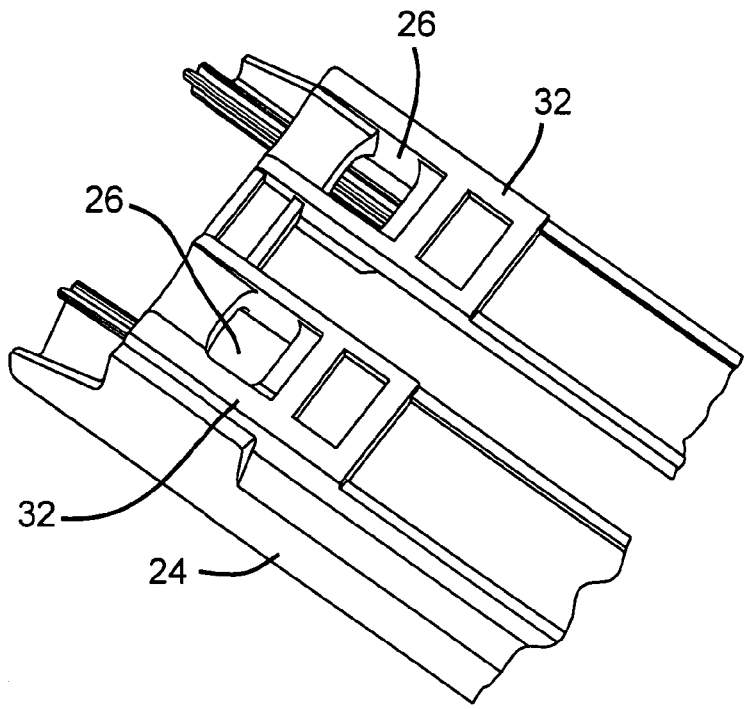
FIG. 4 is a perspective view of the bottom surface of the roller assisted frictional element of the seat track assembly of the present invention.

Referring now to the drawings, there is illustrated in FIG. 1 a vehicle seat, indicated generally at 10. The vehicle seat 10 has a seat back 12 and a seat bottom 14. The seat bottom 14 can be slidably mounted relative to the vehicle frame, or floor 15, by a seat track assembly, indicated generally at 16, in accordance with the present invention. It will be appreciated that some aspects of the illustrated vehicle seat 10 are, in large measure, known in the art, and these aspects are intended merely to illustrate one environment in which this invention may be used. Thus, the scope of this invention is not intended to be limited for use with the specific vehicle seat illustrated in FIG. 1. On the contrary, as will become apparent below, this invention may be used with any style or type of vehicle seat for the purposes described below.

The seat track assembly 16 can be connected to the vehicle floor 15 or to any suitable portion of the vehicle, such as a vehicle frame member (not shown). The seat track assembly 16 can be connected to the vehicle by any suitable means, such as by bolts or threaded fasteners. The seat track assembly 16 includes first track member 20 and a second track member 22 that move relative to each other for moving the seat 10 relative to the floor 15 of the vehicle. In one embodiment, the first track member 20 is operatively connected to the floor 15 of the vehicle, or any other structural member as discussed above, and the second track member 22 is operatively connected to the seat 10. This allows the vehicle seat 10 to move longitudinally fore 16a and aft 16b relative to the vehicle floor 15 such that a seat occupant can position the seat 10 at a desired location relative to the floor for maximum comfort and convenience. Preferably, the vehicle seat 10 has a pair of seat track assemblies 16, one for each side of the seat 10. It is understood, however, that the seat 10 can include any number of seat track assemblies 16, such as a single seat track assembly 16 that would preferably be located near the center of the seat bottom 14, or three or more seat track assemblies 16 equally spaced along the seat bottom 14. It should also be understood that the seat track assembly 16 may be oriented in a position other than that shown in the figures. Additionally, it can be appreciated that the seat track assembly 16 of the present invention may be used to effect movement along multiple axes other than fore and aft. It will also be appreciated that the seat 10 may have additional comfort adjustment mechanisms as well, including but not limited to front elevation adjustment, rear elevation adjustment, seat bottom 14 height adjustment, or seat back 12 back support adjustments (lumbar). However, it will be appreciated that the seat can be moved along any suitable axes of adjustment and have any other necessary comfort adjustments other than those listed above.

FIGS. 2 through 8 illustrate in more detail the seat track assembly 16 of the present invention. As discussed above, the vehicle seat track assembly 16 includes a first track member 20. In one embodiment, the first track member 20 attaches to a vehicle frame. The first track member 20 can have any suitable size and shape for facilitating sliding movement of the seat relative to the other components of the seat track assembly 16. The first track member 20 can be made from any suitable material, such as metal or plastic, and can be formed using any suitable manufacturing process. In one embodiment, the first track member 20 is steel and is formed by a stamping operation. The first track member 20 preferably has an upwardly facing bearing surface 20a (best shown in FIGS. 6-8). The significance of the upwardly facing bearing surface 20a of the first track member 20 will be discussed in greater detail below.

The seat track assembly 16 also includes a second track member 22. In one embodiment, the second track member 22 attaches to the vehicle seat 10. The second track member 22 can have any suitable size and shape for facilitating sliding movement of the seat relative to the other components of the seat track assembly 16. The second track member 22 can be made from any suitable material, such as metal or plastic, and can be formed using any suitable manufacturing process. In one embodiment, the second track member 22 is steel and is formed by a stamping operation. The second track member 22 preferably has an upwardly facing bearing surface 22b (best shown in FIG. 8) and a downwardly facing bearing surface 22a (shown in FIGS. 6-8). The significance of the upwardly facing bearing surface 22b and the downwardly facing bearing surface 22a of the second track member 22 will be discussed in greater detail below. The terms "upwardly" and "downwardly" as they are used with respect to the bearing surfaces 20a of the first track member 20, and 22a, 22b of the second track member 22, are used throughout the specification solely for convenience and should not be deemed as limiting the bearing surfaces 20a, 22a, 22b to orientation in a particular direction. It will be appreciated that the bearing surfaces 20a, 22a, 22b may face any direction and that the individual surfaces 20a, 22a, 22b may face in more than one direction as the first track member 20 and second track member 22 are assembled to form the final seat track assembly 16.

The seat track assembly 16 also preferably includes a roller assisted frictional element (RAFE), or RAFE cage 24. The RAFE cage 24 is disposed between the first track member 20 and the second track member 22. The RAFE cage 24 can be formed using any suitable method and may be formed from any suitable material. Preferably, the RAFE cage 24 is formed from a plastic material that is more easily compressible than the material used to form the first track member 20 and second track member 22. One example of such a material is polypropylene, which has a yield strength of approximately 30 MPa. In comparison, the material yield strength of steel, a suitable material for the first track member 20 and second track member 22, is approximately 340 MPa. It will be appreciated, however, that any other type of plastic or other suitable material that is more easily compressible than the material of the first track member 20 and the second track member 22 may also be used to form the RAFE cage 24. It will also be appreciated that these materials and their corresponding yield strength numbers are illustrative of one embodiment of the invention, and that any other combination of materials with suitable disparity in yield strength between the material used to form the RAFE cage 24 and the material used to form the first track member 20 and the second track member 22 may also be used. The RAFE cage 24 can be any suitable length, and is generally shorter than the overall length of the first track member 20 and second track member 22. The length of the RAFE cage 24 is determined by the amount of travel permitted by the configuration of the RAFE cage 24 as well as the specific design of the RAFE cage 24 elements, which will be discussed in greater detail below. In one embodiment, the maximum travel of the RAFE cage 24 is approximately 280 mm, which translates into the necessary RAFE cage 24 length being slightly larger than approximately one-half of the maximum travel dimension. The RAFE cage 24 can be placed at any point along the seat track assembly 16. Preferably, the RAFE cage 24 is disposed at roughly the midpoint of the overall length of the seat track assembly 16 because the RAFE cage 24 only moves a fraction of the distance that the second track member 22 moves relative to the first track member 20 when the seat track assembly 16 is adjusted longitudinally. In a preferred embodiment, the RAFE cage 24 is displaced approximately 50% of the distance that the second track member 22 moves relative to the first track member 20 when the seat track assembly 16 is adjusted longitudinally. It will be appreciated that the placement of the RAFE cage 24 along the length of the track members 22, 20 is a function of this fractional rate of displacement. It will also be appreciated that the fractional displacement of the RAFE cage 24 relative to the track members 22, 20 as well as the placement of the RAFE cage 24 along the length of the track member 22, 20 can be adjusted to any other suitable configuration as well.

The fractional displacement, or travel, of the RAFE cage 24 relative to the other track members 22, 20 is due to the inclusion of one or more rolling elements 28 on the RAFE cage 24. The rolling element(s) 28 are disposed within openings 26 in the RAFE cage 24 that are specifically shaped and sized to receive the rolling element(s) 28. The rolling element (s) 28 may have any suitable size and shape, and may be connected to the RAFE cage 24 using any suitable fastening means that permits rotational movement of the rolling element(s) 28. The rolling elements(s) 28 may be formed from any suitable material, such as plastic or metal. In one embodiment, the RAFE cage 24 contains four metal rollers as the rolling elements 28, positioned two at each end of the RAFE cage 24. In this embodiment, the rollers 28 have a diameter of approximately 6 mm. The diameter of the rolling element(s) 28 is denoted by $D_1$ in FIGS. 6 and 7. It will be appreciated that there may be any suitable number of suitably sized rolling elements 28 positioned at any suitable location(s) along the RAFE cage 24 as well. It will also be appreciated that FIGS. 3-8 illustrate only one end of the RAFE cage 24, and that for each of the rolling elements 28 illustrated there may be a symmetrically placed rolling element 28 at the other end of the RAFE cage 24 (not shown). The rolling elements 28 are positioned such that each rolling element 28 is in rolling engagement with both the upwardly facing bearing surface 20a of the first track member 20 and the downwardly facing bearing surface 22a of the second track member 22 when the seat track assembly 16 has a loading force, indicated as $F_L$ in FIG. 7, applied thereon. This engagement of the rolling elements 28 with the first and second track members 20, 22 allows for longitudinal movement of the second track member 22 relative to the first track member 20. The operation of the seat track assembly 16 will be discussed in greater detail below.

The RAFE cage 24 may also include one or more bearing elements 40, best shown in FIG. 8. The bearing elements 40 can be any suitable size and shape, and may be formed from any suitable material. In one embodiment of the invention, the ball bearings 40 are formed from steel. The bearing elements 40 are mounted in apertures 25 that are preferably located at either end of the RAFE cage 24. The apertures 25 coincide to the shape and size of the bearing elements 40. It will be appreciated that the apertures 25 and bearing elements 40 may be positioned at any suitable location along the RAFE cage 24 as well. In one embodiment of the invention, four bearing elements 40 are included on the RAFE cage 24, with two bearing elements 40 being symmetrically placed at either end of the RAFE cage in four corresponding apertures 25. It will be appreciated that there may be any suitable number of suitably sized bearing elements 40 mounted in apertures 25 positioned at any suitable location(s) along the RAFE cage 24 as well. In the completed seat track assembly 16, the bearing elements 40 are disposed in a race created by coordination of the shapes of the second track member 22 and the first track member 20. As best shown in FIG. 8, the first track member 20, in its final formed shape, bends around the second track member 22 such that a portion of the second track member 22 and the RAFE cage 24 are contained within the first track member 20 to form the seat track assembly 16. This final shape of the first track member 20, in coordination with the shape of the lower portion of the second track member 22 forms the race for the bearing elements 40. These bearing elements 40 also assist in the longitudinal movement of the second track member 22 relative to the first track member 20. The function of the bearing elements 40 will be discussed in greater detail below.

Figure 6:
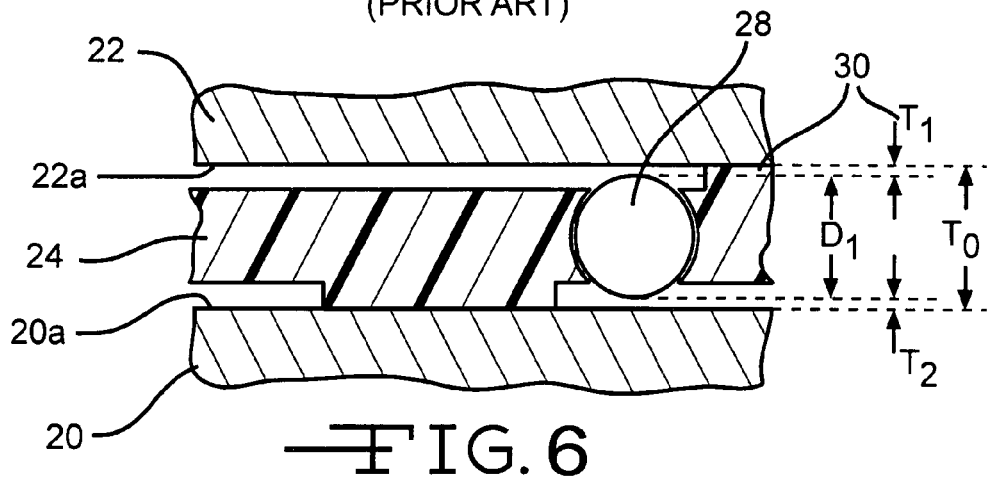
FIG. 6 is a longitudinal cross section of the roller assisted frictional element shown in an unloaded state.
Figure 7:
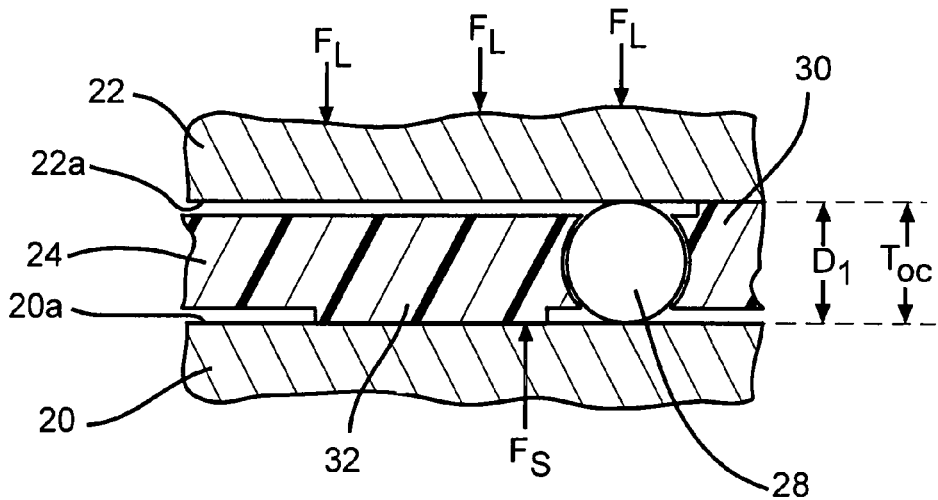
FIG. 7 is a longitudinal cross section taken of the roller assisted frictional element shown in a loaded state.

The RAFE cage 24 is also provided with at least one pad section, shown in multiple configurations at 30, 32 in FIGS. 6 and 7, for engaging at least one of the upwardly facing bearing surface 20a of the first track member 20 and the downwardly facing bearing surface 22a of the second track member 22. In one embodiment of the invention, the RAFE cage 24 contains opposed pad sections for engaging both the upwardly facing bearing surface 20a of the first track member 20 and the downwardly facing bearing surface 22a of the second track member 22. The opposed pad sections 32, 30 may be positioned at any suitable location along the RAFE cage 24, and are preferably positioned adjacent to the rolling element(s) 28. The opposed pad sections 32, 30 may have any suitable size and shape, and may be formed from any suitable compressible material, such as polypropylene. Preferably, the opposed pad sections 32, 30 are formed integrally with the RAFE cage 24, although such is not required. It will be appreciated that the opposed pad sections 32, 30 and/or the entire surface of the RAFE cage 24 may also be coated with any suitable low friction coating material, such as Teflon®, although such is not required. Although the embodiment containing opposed pad sections 30, 32 will be discussed throughout the description, it will be appreciated that the RAFE cage 24 may have any suitable number of pad sections as required by the present invention.

In an unloaded state, which is defined as a complete seat assembly 10 being mounted on the seat track assembly 16, no loading forces $F_L$ have been applied to the seat track assembly 16. In this unloaded state, the pad section 32 has an uncompressed thickness $T_2$ and the pad section 30 has an uncompressed thickness $T_1$. These thicknesses $T_1$ and $T_2$ are best shown in FIG. 6. The opposed pad sections 32 and 30 may have any suitable thickness, $T_2$ and $T_1$ respectively, and the thicknesses $T_2$ and $T_1$ of the pad sections 32, 30 may, but need not be equal. The overall cross-sectional thickness, designated $T_O$, includes the combined thickness $T_2$ and $T_1$ of the pad sections 32, 30 and the additional thickness of the material forming the RAFE cage 24, is preferably greater than the diameter $D_1$ of the rolling element(s) 28 when the seat track assembly 16 is in the unloaded state. Thus, the overall cross-sectional thickness $T_O$ of the RAFE cage 24 separates the upwardly facing bearing surface 20a of the first track member 20 and the downwardly facing bearing surface 22a of the second track member 22 from each other by a distance that is greater than the diameter $D_1$ of the rolling element(s) 28. The thicknesses $T_2$ and $T_1$, as shown in the Figures, have been exaggerated for purposes of illustration. It will be appreciated that the individual dimensions and the proportion of the thicknesses $T_2$ and $T_1$ relative to the additional thickness of the material forming the RAFE cage 24 may vary from the dimensions and proportions illustrated in the Figures. It will also be appreciated that the acceptable range for the overall cross-sectional thickness $T_O$ may vary depending upon the compressibility of the type of material used to form the opposed pad sections 32, 30, the compressibility of the material(s) used to form the first track member 20 and the second track member 22, as well as the diameter of the rolling element(s) 28.

The overall cross-sectional thickness $T_O$ of the RAFE cage 24 at the opposed pad sections 32, 30 exceeds the diameter $D_1$ of the rolling element 28 by an amount sufficient to cushion the points of contact between the cage 24 and the upwardly facing bearing surface 20a of the first track member 20 and the downwardly facing bearing surface 22a of the second track member 22. This cushioning occurs as a result of a resistive force component, shown as $F_S$ in FIG. 7, which negates at least a portion of the force $F_L$ placed on the seat track assembly 16 in a loaded state. A loaded state, as used herein, refers to the weight of an average seat occupant in addition to the weight of the seat assembly 10 being placed upon the seat track assembly 10. The function of the RAFE cage 24 within the seat track assembly 16 will be discussed in greater detail below.

Figure 5:
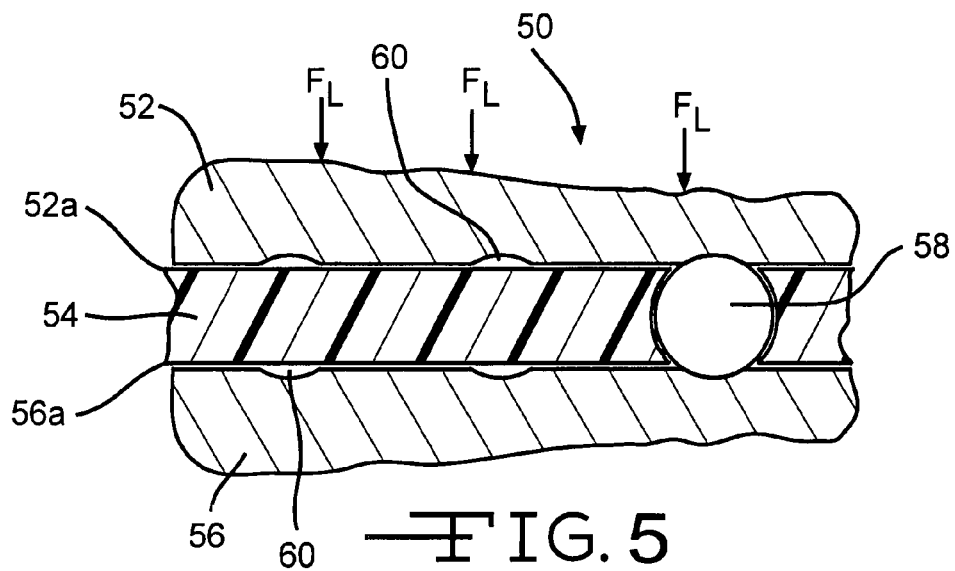
FIG. 5 is a longitudinal cross section of a prior art roller assisted element.

FIG. 5 illustrates a prior art seat track assembly, indicated generally at 50. In the prior art, an upper track 52 and a lower track 56 are separated by an intermediate frictional element 54. It is known in the prior art to use either a cage type element including one or more rolling elements 58, as illustrated, or to use a frictional element without rolling elements. When a loading force $F_L$ is applied to the seat track assembly 50, indentations 60 may form along the contact surfaces 52a, 56a of the upper seat track 52 and lower seat track 56, respectively. These indentations 60 make longitudinal adjustment of the seat track assembly 50 very rough and uncomfortable for the user. This track roughness issue is a particular problem for existing seat track designs.

In contrast to the prior art, the design of the RAFE cage 24 of the seat track assembly 16 overcomes or reduces this track roughness issue. Referring to FIGS. 6 and 7, the combined overall cross-sectional thickness $T_O$ of the RAFE cage 24 separates the upwardly facing bearing surface 20a of the first track member 20 and the downwardly facing bearing surface 22a of the second track member 22 from each other by a distance that is greater than the diameter $D_1$ of the rolling element(s) 28 when the seat track assembly 16 is in an unloaded state. Thus, in the unloaded state, the possibility of indentations forming in the upwardly facing bearing surface 20a of the first track member 20 and the downwardly facing bearing surface 22a of the second track member 22 from prolonged contact with the roller element(s) 28 is greatly reduced because the bearing surfaces 20a, 22a do not contact the rolling element(s). In a loaded state, which is best shown in FIG. 7, a loading force $F_L$ is applied to the seat track assembly 16. In response to this loading force $F_L$, the thicknesses $T_2$ and $T_1$ of the opposed pad sections 32, 30 are compressed. The compression of the opposed pad sections 32, 30 generates a resistive force $F_S$ that counteracts at least a portion of the loading force $F_L$ applied to the seat track assembly 16. The compression of the opposed pad sections 32, 30 results in the overall compressed cross-sectional thickness, designated as $T_{OC}$ in FIG. 7, of the RAFE cage 24 becoming approximately equal to the diameter $D_1$ of the rolling element(s) 28. It will be appreciated that the loading force $F_L$ required to result in the compressed cross-sectional thickness $T_{OC}$ may vary dependent upon the thicknesses $T_2$ and $T_1$ of the opposed pad sections 32, 30, the characteristics of the rolling element(s) 28 used in the RAFE cage 24, and/or the dimensional characteristics of the first track member 20 and second track member 22. In the compressed state of the RAFE cage 24, the rolling element(s) 28 contact the upwardly facing bearing surface 20a of the first track member 20 and the downwardly facing bearing surface 22a of the second track member 22, which in turn allows the rolling element(s) 28 of the RAFE cage 24 to facilitate smooth longitudinal movement of the second track member 22 relative to the first track member 20.

In addition to the rolling element(s) 28, the ball bearings 40 mounted in the apertures 25 of the RAFE cage 24 may also assist in the longitudinal movement of the second track member 22 relative to the first track member 20. As best shown in FIG. 8, the first track member 20 is formed around the second track member 22 such that a portion of the second track member 22 and the RAFE cage 24 are contained within the first track member 20 to form the seat track assembly 16. This final shape of the first track member 20, in coordination with the shape of the lower portion of the second track member 22 forms the race for the bearing elements 40. This configuration allows the bearing element(s) 40 to contact the upwardly facing bearing surface 20a of the first track member 20 (which has been formed about a portion of the second track member 22 and the RAFE cage 24, as discussed above) and an upwardly facing bearing surface 22b of the second track member 22. It will be appreciated that the bearing surfaces 20a, 22b forming the race for the bearing element(s) 40 may be coated or lubricated with any suitable non-friction material, although such is not required. These bearing elements 40 also assist in the longitudinal movement of the second track member 22 relative to the first track member 20 by providing another point of rolling engagement between the second track member 22 and the first track member 20.

The opposed pad sections 30, 32 of the RAFE cage 24 provide the particular advantage of counteracting the loading force $F_L$ placed on the seat track assembly 16 in a loaded state. When the thicknesses $T_1$ and $T_2$ of the opposed pad sections 30, 32 are compressed, the overall compressed cross-sectional thickness $T_{OC}$ of the RAFE cage 24 is approximately equal to the diameter $D_1$ of the rolling element(s) 28. In conjunction with this compressed thickness $T_{OC}$, the compression of the thicknesses $T_1$ and $T_2$ provide a resistive force $F_S$ that counteracts a portion of the loading force $F_L$ placed on the seat track assembly 16. As a result, the upwardly facing bearing surface 20a of the first track member 20 and the downwardly facing bearing surface 22a of the second track member 22 are cushioned or buffered from the loading force $F_L$, which decreases the likelihood or severity of indentations or bumps (such as those indentations 60 shown in FIG. 5) forming on the bearing surfaces 20a, 22a of the track members 20, 22. Thus, the RAFE cage 24 of the present invention helps to alleviate the track roughness issue of the intermediate frictional elements 54 of the prior art.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle seat track assembly comprising a first track member for attachment to a vehicle frame, the first track member having an upwardly facing bearing surface, a second track member for attachment to a vehicle seat, the second track member having a downwardly facing bearing surface, and a cage disposed between the first track member and the second track member, the cage carrying a rolling element that is in rolling engagement with the upper and lower bearing surfaces to provide longitudinal movement of the first track member relative to the second track member, wherein:

the cage is provided with at least one pad section for engaging at least one of the upwardly and downwardly facing bearing surfaces, wherein in an unloaded state, the at least one pad section separates the upwardly and downwardly facing bearing surfaces from each other by a distance which is greater than the diameter of the rolling element.

2. The vehicle seat track assembly of claim 1, wherein the cage includes a plurality of pad sections that are located proximally to the rolling element, said pad sections being arranged in an opposing manner.

3. The vehicle seat track assembly of claim 2, wherein the cage includes a plurality of rolling elements and a plurality of opposed pad sections.

4. The vehicle seat track assembly of claim 2 wherein each of the opposed pad sections is located adjacent to each of the roller elements.

5. The vehicle seat track assembly of claim 2, wherein the opposed pad sections are formed from a compressible material.

6. The vehicle seat track assembly of claim 4, wherein the opposed pad sections are formed from a compressible material.

7. The vehicle seat track assembly of claim 2 wherein the opposed pad sections are integrally formed with the cage.

8. The vehicle seat track assembly of claim 7 wherein the opposed pad sections are formed from a compressible material.

9. The vehicle seat track assembly of claim 1 wherein the cage further comprises a bearing element.

10. The vehicle seat track assembly of claim 9 wherein the cage further comprises a plurality of bearing elements.

11. The vehicle seat track assembly of claim 2 wherein the overall cross sectional thickness of the cage at the opposed pad sections exceeds the diameter of the rolling element by an amount sufficient to cushion the points of contact between the cage and the upwardly and downwardly facing bearing surfaces by providing a resistive force component that negates at least a portion of the force placed on the seat track assembly in a loaded state.

12. A vehicle seat track assembly comprising a first track member for attachment to a vehicle frame, the first track member having an upwardly facing bearing surface, a second track member for attachment to a vehicle seat, the second track member having an upwardly facing bearing surface and a downwardly facing bearing surface, and a cage disposed between the first track member and the second track member, the cage carrying a plurality of rolling element that are in rolling engagement with the upwardly facing bearing surface of the first track member and the downwardly facing bearing surface of the second track member to provide longitudinal movement of the first track member relative to the second track member, wherein:

the cage is provided with a plurality of opposed pad sections for engaging the upwardly facing bearing surface of the first track member and the downwardly facing bearing surface of the second track member, wherein in an unloaded state, the opposed pad sections separate the upwardly facing bearing surface of the first track member and the downwardly facing bearing surface of the second track member from each other by a distance which is greater than the diameter of the rolling elements.

13. The vehicle seat track assembly of claim 12, wherein the cage further comprises a plurality of bearing elements, the bearing elements being arranged such that the bearings contact the upwardly facing bearing surface of the first track member and the upwardly facing bearing surface of the second track member.

14. The vehicle seat track assembly of claim 12 wherein each of the opposed pad sections is located adjacent to each of the roller elements.

15. The vehicle seat track assembly of claim 14, wherein the opposed pad sections are formed from a compressible material.

16. The vehicle seat track assembly of claim 12 wherein the opposed pad sections are integrally formed with the cage.

17. The vehicle seat track assembly of claim 12 wherein the overall cross sectional thickness of the cage including the opposed pad sections exceeds the diameter of the rolling elements by an amount sufficient to cushion the points of contact between the cage and the upward bearing surface of the first track member and the downward bearing surface of the second track member by providing a resistive force component that negates at least a portion of the force placed on the seat track assembly in a loaded state.

18. A vehicle seat track assembly comprising:
   a first track member adapted to be attached to a vehicle frame, the first track member having a first bearing surface,
   a second track member adapted to be attached to a vehicle seat, the second track member having a second bearing surface, and
   a cage disposed between the first track member and the second track member, the cage carrying a rolling element that defines a diameter, wherein:
   the cage is provided with at least one pad section that engages at least one of the first and second bearing surfaces,
   the cage has an overall thickness in the region of the pad section that is greater than the diameter of the rolling element,
   in an uncompressed state, the cage maintains the at least one of the first and second bearing surfaces from contacting the rolling element, and
   in a compressed state, the cage allows the at least one of the first and second bearing surfaces to contact the rolling element.

\* \* \* \* \*